No. 665,954. Patented Jan. 15, 1901.
W. C. CLOUSE.
METHOD OF MANUFACTURING ELECTROPLATES.
(Application filed Nov. 14, 1898.)
(No Model.)
Fig. 1
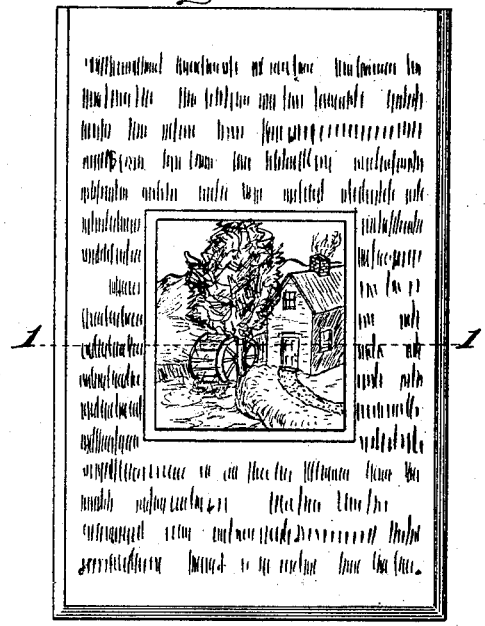
Fig. 4
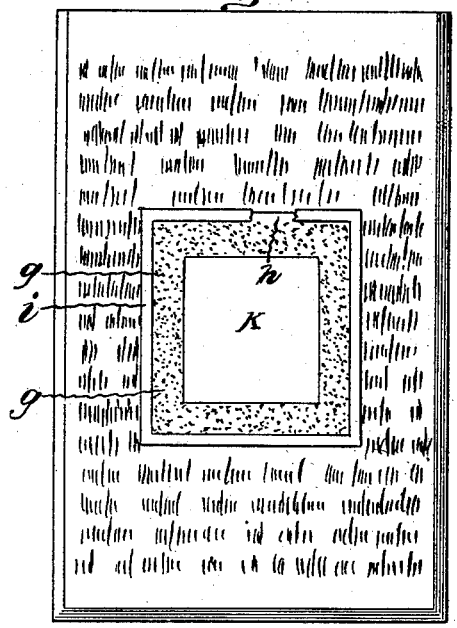
Fig. 3
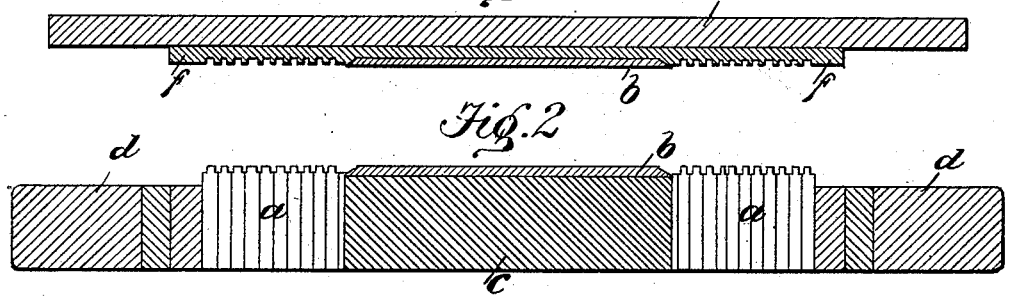
Fig. 2
Fig. 5
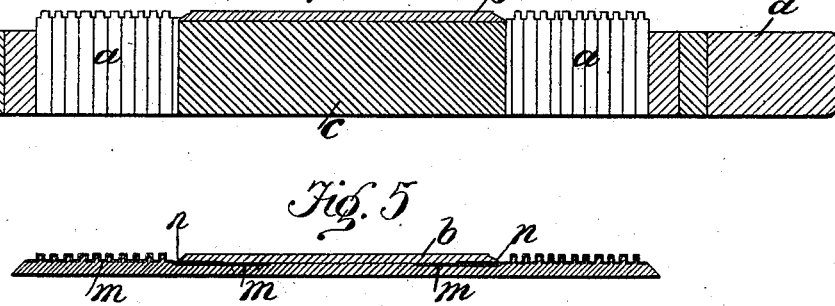
WITNESSES:
Geo. B Rowley.
Seabury C. Martick
Warren C. Clouse INVENTOR

United States Patent Office.

WARREN C. CLOUSE, OF KEARNY, NEW JERSEY, ASSIGNOR, BY MESNE ASSIGNMENTS, TO THE CHARLES CRASKE COMPANY.

METHOD OF MANUFACTURING ELECTROPLATES.

SPECIFICATION forming part of Letters Patent No. 665,954, dated January 15, 1901.

Application filed November 14, 1898. Serial No. 696,474. (No specimens.)

*To all whom it may concern:*

Be it known that I, WARREN CHRIVLIAN CLOUSE, a citizen of the United States, and a resident of Kearny, in the county of Hudson and State of New Jersey, have invented certain new and useful Improvements in Methods for the Manufacture of Electroplates, of which the following is a specification.

My invention consists of a certain new and useful method of manufacturing electroplates or electrotypes in which the half-tone originals or etchings for illustration are combined with electrotypes of reading matter in the manner hereinafter described. The usual method of preparing electrotypes of this description has been as follows: The electrotype of reading matter was first prepared in the well-known manner hereinafter described, but having a blank space the size of the half-tone to be inserted. The portion covered by the blank space was then cut away. The half-tone being much thinner than the electrotype, it was necessary to back the same with metal to the thickness of the electrotype. The half-tone after being backed was then fitted to the opening in the electrotype and soldered in. This process was long, inconvenient, and expensive, and in spite of the greatest care the half-tone would work loose during printing, causing delay in repairing and frequently resulting in injury to the surrounding electrotype.

The object of my invention is to overcome the difficulties heretofore existing and to produce an electrotype in which the half-tone and the reading matter will be and remain firm and immovable in one solid piece. I attain this object by the means illustrated in the accompanying drawings, in which—

Figure 1 shows the completed electrotype with half-tone illustration inserted as made by my improved method. Fig. 2 shows a form in cross-section in which the type and half-tone appear locked in chase. Fig. 3 shows in cross-section the mold taken from the parts, as shown in Fig. 2, having the half-tone embedded in the mold. Fig. 4 is a plan view of Fig. 3, showing in addition the method of preparing the half-tone for the electrodepositing-bath. Fig. 5 is a cross-section along the line 1 1 of the completed electrotype, as shown in Fig. 1.

Similar letters refer to similar parts throughout the several views.

In Fig. 2 the type $a$, the half-tone $b$, face up, and the base or blank block $c$, preferably of metal, loosely placed under the half-tone to make it type-high, are represented as locked together in the chase $d$. The back of the half-tone before being placed in the form is indented or stippled for about one-quarter of an inch along each edge, as shown in exaggerated form at $g$ in Fig. 4, leaving about one-eighth of an inch along each edge unindented, as shown at $h$ in said figure. The reason for the stippling will hereinafter appear. After being locked in chase the face of the half-tone may be covered with a film of pitch or similar substance to insure its adherence to the mold and to protect the enameled face of the half-tone during the subsequent operations, and at the conclusion of said operations it may be removed in any suitable way. The form is then blackleaded to cause it to relieve freely from the molding composition. The form is then molded in the usual way, as illustrated in Fig. 3, in which $e$ designates the metal plate of the mold-case, with the edge-guards removed, and $f$ the wax or molding composition on said plate, the impression having been taken from Fig. 2, as shown, the half-tone being embedded in and adhering to the molding composition, face inward, its face being protected by the pitch or similar substance above referred to. A strip of wax about one-eighth of an inch in width, as shown at $i$ in Fig. 4, may then be placed along the edge of the reverse side of the half-tone, over the unindented portion $h$, in order to prevent the depositing solution from reaching or touching the face thereof and to hold the half-tone firmly in the form during the process of blackleading. The mold is then thoroughly blackleaded in the usual way preparatory to being placed in the electrodepositing-bath; but before being placed in the bath the exposed back of the half-tone should be freed from black-lead, scraped bright, and preferably a film-coating of wax placed on the back from the indentations inward, as shown at k in Fig. 4, so as to make that portion non-conducting in the bath. The entire back of the half-tone could of course be stippled and deposited upon; but I have found that by the stippling as hereinbefore described the desired security and firmness are obtained. The mold, as described, is then placed in the electrodepositing-bath and metal deposited thereon in the usual manner, the metal forming a continuous and unbroken shell over the form and over the edges of the half-tone to the wax film in the center thereof, as shown at m in Fig. 5, entering into the indentations in such manner as to form a perfect union between the electrotype and the half-tone, the two forming practically one plate. If the wax strip i is used, the deposited metal will be unattached to the half-tone at the edges thereof, as shown at n in Fig. 5, as i prevents the deposited metal from coming into contact with the half-tone, and in this case it is not necessary to stipple to the extreme edge of the half-tone. The said shell and half-tone are then relieved from the mold, the wax on the back of the half-tone being removed by any suitable means, such as hot water and lye, and the shell is then ready to receive the metal backing. The washing with hot water and lye perfectly cleanses the back of the half-tone, so that the metal backing may firmly adhere to it. The whole shell may be acidified in preparation for the metal backing, which is placed on in the usual way and finished in the same manner as ordinary electrotypes, the completed electrotype being shown in cross-section in Fig. 5.

By this method I obtain economically and quickly the perfect incorporation of the half-tone with an electrotype of reading matter, as set forth.

What I claim as my invention is—

1. The method of obtaining an electrotype including a half-tone or etched or engraved plate and an electrotype of reading matter, which consists in first, locking up in a form of type a blank block of the size of the half-tone having the half-tone placed loosely thereon with its face flush with the types; second, blackleading the type-form; third, obtaining in plastic material placed in contact with said form and half-tone a mold from the type in said form; fourth, removing said form from the mold with the half-tone adherent thereto; fifth, blackleading the face of said mold but leaving the exposed back of the half-tone free from black-lead; sixth, placing the mold containing the embedded half-tone in an electrodepositing-bath whereby is produced a metallic deposit over the mold and the back of the half-tone at the same time, thus insuring a union between the metallic deposit and the back of the half-tone, substantially as set forth.

2. In the method of obtaining an electrotype including a half-tone or etched or engraved plate and an electrotype of reading matter, the production in plastic material of a mold from the type-form while the half-tone is embedded in said mold, and the removal of a deposited metallic shell from the mold with the said half-tone adherent to it, substantially as herein described.

3. In the method of obtaining an electrotype including a half-tone or etched or engraved plate and an electrotype of reading matter, the successive acts of embedding a half-tone or etched or engraved plate, face inward, in a mold taken from a type-form and of depositing in said mold and over the edge and back of said plate, by electrometallurgy, a metallic shell which unites said plate and metallic deposit, substantially as herein described.

4. The method of obtaining an electrotype including a half-tone or etched or engraved plate and an electrotype of reading matter, which consists in first, indenting or stippling the back of the half-tone; second, locking up in a form of type a blank block of the size of the half-tone having the half-tone placed loosely thereon with its face flush with the types; third, covering the face of the half-tone with a film of pitch or similar substance; fourth, obtaining in plastic material placed in contact with said form and half-tone a mold from the type in said form; fifth, removing said form from the mold with the half-tone adherent thereto; sixth, blackleading the face of said mold but leaving the exposed back of the half-tone free from black-lead; seventh, placing the mold containing the embedded half-tone in an electrodepositing-bath whereby is produced a metallic deposit over the mold and the back of the half-tone at the same time, thus insuring a union between the metallic deposit and the back of the half-tone, substantially as set forth.

5. The method of obtaining an electrotype including a half-tone or etched or engraved plate and an electrotype of reading matter, which consists in first, indenting or stippling the back of the half-tone; second, locking up in a form of type a blank block of the size of the half-tone having the half-tone placed loosely thereon with its face flush with the types; third, covering the face of the half-tone with a film of pitch or similar substance; fourth, obtaining in plastic material placed in contact with said form and half-tone a mold from the type in said form; fifth, removing said form from the mold with the half-tone adherent thereto; sixth, placing a strip of plastic material around the edge of the half-tone; seventh, blackleading the face of said mold but leaving the exposed back of the half-tone free from black-lead; eighth, placing the mold containing the embedded half-tone in an electrodepositing-bath whereby is produced a metallic deposit over the mold and the back of the half-tone at the same time, thus insuring a union between the metallic deposit and the back of the half-tone, substantially as set forth.

6. The method of obtaining an electrotype including a half-tone or etched or engraved plate and an electrotype of reading matter, which consists in first, indenting or stippling the back of the half-tone; second, locking up in a form of type a blank block of the size of the half-tone having the half-tone placed loosely thereon with its face flush with the types; third, covering the face of the half-tone with a film of pitch or similar substance; fourth, obtaining in plastic material placed in contact with said form and half-tone a mold from the type in said form; fifth, removing said form from the mold with the half-tone adherent thereto; sixth, placing a strip of plastic material around the edge of the half-tone; seventh, blackleading the face of said mold but leaving the exposed back of the half-tone free from black-lead; eighth, placing a non-conducting substance on the back of said half-tone leaving the indentations exposed around the edge thereof; ninth, placing the mold containing the embedded half-tone in an electrodepositing-bath whereby is produced a metallic deposit over the mold and the back of the half-tone at the same time, thus insuring a union between the metallic deposit and the back of the half-tone, substantially as set forth.

7. The method of obtaining an electrotype including a half-tone or etched or engraved plate and an electrotype of reading matter, which consists in first, locking up in a form of type a blank block of the size of the half-tone having the half-tone placed loosely thereon with its face flush with the types; second, covering the face of the half-tone with a film of pitch or similar substance; third, obtaining in plastic material placed in contact with said form and half-tone a mold from the type in said form; fourth, removing said form from the mold with the half-tone adherent thereto; fifth, blackleading the face of said mold but leaving the exposed back of the half-tone free from black-lead; sixth, placing the mold containing the embedded half-tone in an electrodepositing-bath whereby is produced a metallic deposit over the mold and the back of the half-tone at the same time, thus insuring a union between the metallic deposit and the back of the half-tone, substantially as set forth.

8. The method of obtaining an electrotype including a half-tone or etched or engraved plate and an electrotype of reading matter, which consists in first, indenting or stippling the back of the half-tone; second, locking up in a form of type a blank block of the size of the half-tone having the half-tone placed loosely thereon with its face flush with the types; third, obtaining in plastic material placed in contact with said form and half-tone a mold from the type in said form; fourth, removing said form from the mold with the half-tone adherent thereto; fifth, blackleading the face of said mold but leaving the exposed back of the half-tone free from black-lead; sixth, placing the mold containing the embedded half-tone in an electrodepositing-bath whereby is produced a metallic deposit over the mold and the back of the half-tone at the same time, thus insuring a union between the metallic deposit and the back of the half-tone, substantially as set forth.

9. The method of obtaining an electrotype including a half-tone or etched or engraved plate and an electrotype of reading matter, which consists in first, locking up in a form of type a blank block of the size of the half-tone; having the half-tone placed loosely thereon with its face flush with the types; second, covering the face of the half-tone with a film of pitch or similar substance; third, obtaining in plastic material placed in contact with said form and half-tone a mold from the type in said form; fourth, removing said form from the mold with the half-tone adherent thereto; fifth, placing a strip of plastic material around the edge of the half-tone; sixth, blackleading the face of said mold but leaving the exposed back of the half-tone free from black-lead; seventh, placing the mold containing the embedded half-tone in an electrodepositing-bath whereby is produced a metallic deposit over the mold and the back of the half-tone at the same time, thus insuring a union between the metallic deposit and the back of the half-tone, substantially as set forth.

10. The method of obtaining an electrotype including a half-tone or etched or engraved plate and an electrotype of reading matter, which consists in first, indenting or stippling the back of the half-tone; second, locking up in a form of type a blank block of the size of the half-tone having the half-tone placed loosely thereon with its face flush with the types; third, obtaining in plastic material placed in contact with said form and half-tone a mold from the type in said form; fourth, removing said form from the mold with the half-tone adherent thereto; fifth, placing a strip of plastic material around the edge of the half-tone; sixth, blackleading the face of said mold but leaving the exposed back of the half-tone free from black-lead; seventh, placing the mold containing the embedded half-tone in an electrodepositing-bath whereby is produced a metallic deposit over the mold and the back of the half-tone at the same time, thus insuring a union between the metallic deposit and the back of the half-tone, substantially as set forth.

11. The method of obtaining an electrotype including a half-tone or etched or engraved plate and an electrotype of reading matter, which consists in first, indenting or stippling the back of the half-tone; second, locking up in a form of type a blank block of the size of the half-tone having the half-tone placed loosely thereon with its face flush with the types; third, obtaining in plastic material placed in contact with said form and half-tone a mold from the type in said form; fourth, removing said form from the mold with the half-tone adherent thereto; fifth, placing a strip of plastic material around the edge of the half-tone; sixth, blackleading the face of said mold but leaving the exposed back of the half-tone free from black-lead; seventh, placing a non-conducting substance on the back of said half-tone leaving the indentations exposed around the edge thereof; eighth, placing the mold containing the embedded half-tone in an electrodepositing-bath whereby is produced a metallic deposit over the mold and the back of the half-tone at the same time, thus insuring a union between the metallic deposit and the back of the half-tone, substantially as set forth.

12. The method of obtaining an electrotype including a half-tone or etched or engraved plate and an electrotype of reading matter, which consists in first, indenting or stippling the back of the half-tone; second, locking up in a form of type a blank block of the size of the half-tone having the half-tone placed loosely thereon with its face flush with the types; third, covering the face of the half-tone with a film of pitch or similar substance; fourth, obtaining in plastic material placed in contact with said form and half-tone a mold from the type in said form; fifth, removing said form from the mold with the half-tone adherent thereto; sixth, blackleading the face of said mold but leaving the exposed back of the half-tone free from black-lead; seventh, placing a non-conducting substance on the back of said half-tone leaving the indentations exposed around the edge thereof; eighth, placing the mold containing the embedded half-tone in an electrodepositing-bath whereby is produced a metallic deposit over the mold and the back of the half-tone at the same time, thus insuring a union between the metallic deposit and the back of the half-tone, substantially as set forth.

13. The method of obtaining an electrotype including a half-tone or etched or engraved plate and an electrotype of reading matter, which consists in first, indenting or stippling the back of the half-tone; second, locking up in a form of type a blank block of the size of the half-tone having the half-tone placed loosely thereon with its face flush with the types; third, obtaining in plastic material placed in contact with said form and half-tone a mold from the type in said form; fourth, removing said form from the mold with the half-tone adherent thereto; fifth, blackleading the face of said mold but leaving the exposed back of the half-tone free from black-lead; sixth, placing a non-conducting substance on the back of said half-tone leaving the indentations exposed around the edge thereof; seventh, placing the mold containing the embedded half-tone in an electrodepositing-bath whereby is produced a metallic deposit over the mold and the back of the half-tone at the same time, thus insuring a union between the metallic deposit and the back of the half-tone, substantially as set forth.

In testimony that I claim the foregoing as my invention I have signed my name, in presence of two witnesses, this 2d day of November, 1898.

WARREN C. CLOUSE.

Witnesses:
HERMAN A. HEYDT,
L. AUSTIN JOHNSON.